Figure 1:
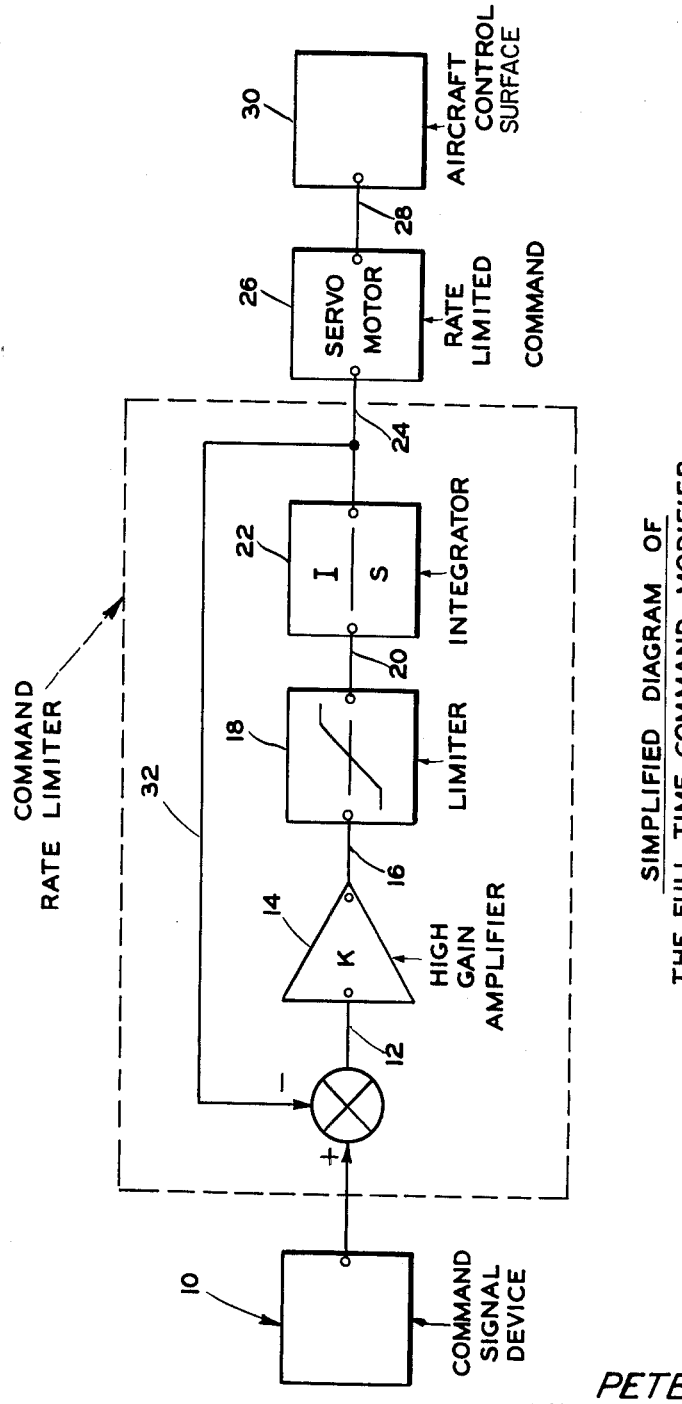

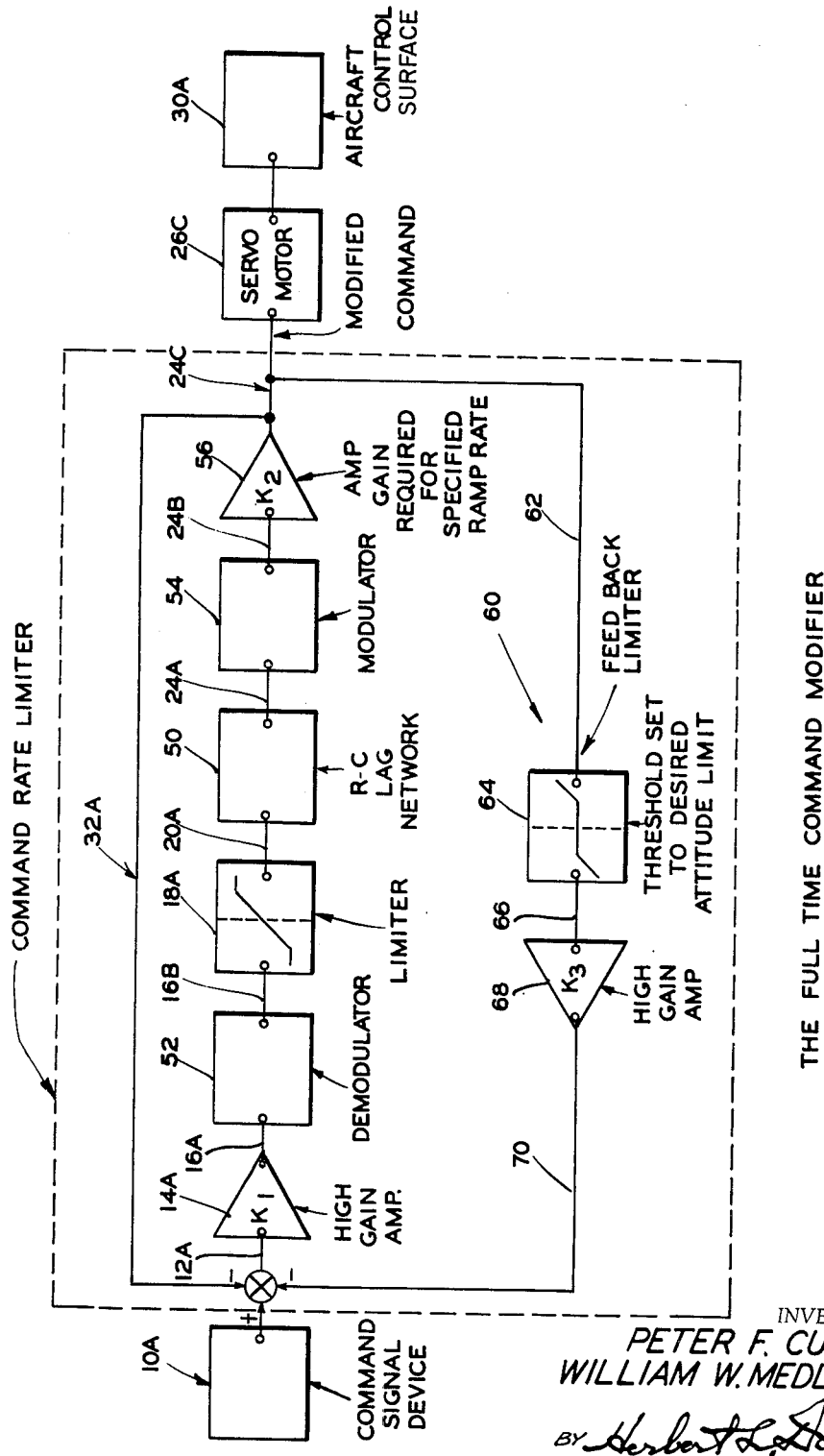

United States Patent Office

3,201,675
Patented Aug. 17, 1965

3,201,675
MAXIMUM COMMAND LIMITER DEVICE FOR AN AUTOMATIC FLIGHT CONTROL SYSTEM
Peter F. Curran, Maywood, and William W. Medlinski, Clifton, N.J., assignors to The Bendix Corporation, Teterboro, N.J., a corporation of Delaware
Filed Nov. 1, 1962, Ser. No. 234,734
12 Claims. (Cl. 318—489)

This invention relates to flight control systems and more particularly to a full time command modifier for such systems.

One of the major problems encountered in automatic flight control systems is that of precluding excessive aircraft maneuvers to avoid damage to the aircraft because of excessive craft attitude rates or accelerations. Also, in commercial aircraft, excessive aircraft maneuvers cause passenger discomfort. Such maneuvers are caused by large command signals which may arise from large error signals during mode engagement or by large rapid commands.

In a heading control system, for example, large heading errors present when the system is engaged in a preselected heading mode, if not suppressed, result in excessive craft roll rates and/or craft roll accelerations. Similarly, the radio mode upon engagement may introduce large rapid commands to the roll control channel of the flight control system. Also, the pilot may introduce excessive command signals to the flight control system by means of the control column sensor or other manual command device. Of course, to avoid this difficulty the pilot could recycle the flight control system prior to engagement and could exercise caution in introducing commands into the system after engagement.

In one flight control system known heretofore, the amplitude of roll command signals was limited by means of a roll attitude command limiter so that craft roll rates and roll accelerations were limited accordingly. A system of this kind provided sluggish craft heading response because heading rate was directly proportional to roll attitude. To avoid this problem, another flight control system limited the amplitude of commands only during mode engagement, but such a system did not avoid excessive craft maneuvers by large commands thereafter.

In another flight control system known heretofore, roll commands and roll attitude feedback were amplitude limited by suitable means to a desired maximum value and balanced against craft roll rate feedback to provide roll rate commands for the aircraft. This system has the advantage of limiting the rate of roll command, yet permits maximum craft bank angle. This technique is not always practical because some aircraft do not require roll rate feedback and, if the roll rate feedback is small, the scaling of the autopilot signal chain became impractical. However, with such a system the autopilot is incapable of use in different types of aircraft without the necessity of tailoring roll command limits to the particular aircraft. It has been found, however, that there are many advantages inherent in limiting rate of roll command if properly implemented.

One object of the present invention, therefore, is to provide an automatic flight control system having a full time command modifier which limits the rate of attitude command to avoid excessive vehicle maneuvers, yet is capable of use in different types of aircraft without the necessity of tailoring the attitude command limits to the particular aircraft.

Another object of the invention is to provide an automatic flight control system having a full time command modifier which limits the rate of attitude command to avoid excessive vehicle maneuvers yet introduce negligible lag for low amplitude command signals.

Another object of the invention is to provide an automatic flight control system having a full time command modifier including integrating means and in which the output of the integrating means is limited to avoid overshoots.

The invention contemplates a full time command modifier for a flight control system which attains the above objects by providing signals corresponding to the rate of change of the command signals and applying these signals to an amplitude limiter having a predetermined maximum output. When the signals are less than the predetermined maximum output, the amplitude limiter has negligible effect on the signals for controlling the craft.

The signals corresponding to rate of change of the command signals may be provided by a command rate limiter which receives the command signals at its input and provide at its output a rate limited signal which may be combined with signals from other sensors on the craft to control a servo motor for operating the craft control surface to maneuver the craft. The signal at the output of the command rate limiter is fed back through a feedback circuit to the input in opposition to the command signal. The difference signal corresponds to the rate of change of the command signal and is applied to a high gain amplifier and the amplified signal is applied to an amplitude limiter. The amplified limited signal is then applied to integrating means, which may be an integrator or a resistance capacitance lag network, connected to the output of the command rate limiter.

The feedback circuit may include a first path of relatively low gain for feeding back all the signals at the output to the input and a second path of relatively high gain to limit the output of the integrating means including a threshold device for passing signals above a predetermined amplitude only and a high gain amplifier.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 1 is a schematic of a flight control system including a command rate limiter constructed according to the invention which acts as a full time command modifier for command signals; and FIGURE 2 is a view similar to FIGURE 1 with a modified form of command rate limiter constructed according to the invention and in which parts corresponding to those shown in FIGURE 1 are indicated by like numerals bearing a letter suffix.

Referring to the drawings, it will be seen that only a single command signal channel of the automatic flight control system for the aircraft has been shown and that the several components making up the command signal channel have been shown by way of boxes, it being recognized that such component parts are well known in the art and may be implemented by well known electrical, hydraulic or mechanical structures to effect the desired functions called for. While only a single command signal channel has been shown, it should be understood that the command rate limiter may be applied to the roll, pitch, or yaw channel of an automatic flight control system.

Referring then to FIGURE 1 which shows a novel command rate limiter, there is indicated by the numeral 10 a suitable command signal device such as a directional gyro or radio beam responsive device, the output signals of which are applied through a summation device 12 to a high gain amplifier 14 of conventional type. Output signals from the high gain amplifier 14 are in turn applied through a signal conductor 16 to an amplitude limiter 18 which may be of a conventional type. The output of limiter 18 is in turn connected through a signal conductor 20 to an integrating means, such as an integrator 22, also of conventional type and having an output signal applied through a signal conductor 24 to a servomotor 26 of conventional type, which in turn is arranged to position through an output shaft 28 a suitable aircraft control surface 30 of a type well known in the art. A feedback signal is applied through a signal conductor 32 from the signal output conductor 24 from the integrator 22 to the summation device 12. The feedback signal applied through the conductor 32 acts in opposition to the controlling signal applied by the device 10 and tends to retard the effect of the controlling signal. The difference signal at summation device 12 is proportional to the rate of change of the command signal, hereinafter referred to as the rate command signal. The rate command signal is the error between the integrated feedback 32 and the command signal which provides the approximated differentiated displacement signal $\Delta C/\Delta T$, that is, the rate command signal.

In the aforenoted arrangement, the rate command signals are amplitude limited by feeding the rate command signals through a limiter 18 having a predetermined maximum output. Thus, when the rate command signals are less than the predetermined maximum output, the limiter 18 has negligible effect on such rate command signals. However, the arrangement is such that the limiter 18 limits the rate command signal without effecting the stability of the reference loop.

In the modified form of the invention, shown in FIGURE 2, and for an automatic flight control system utilizing an A.C. carrier voltage, the integrating means 22, shown in FIGURE 1, may be in the form of a resistance-capacitance lag network of conventional type indicated in the drawing of FIGURE 2 by the numeral 50. Such arrangement does result in hardware simplification.

Moreover, in such an automatic flight control system utilizing an A.C. carrier voltage, there may be provided a demodulator, as indicated in FIGURE 2 by the numeral 52 of conventional type, and a modulator 54 of conventional type may also be provided. The block diagram of the implementation of the system is illustrated in FIGURE 2.

In such arrangement, output signals from the high gain amplifier 14A are applied through signal conductor 16A to the demodulator 52 having an output connected through a conductor 16B to the input of the limiter 18A of conventional type. The output of the limiter 18A is in turn connected through a signal conductor 20A to the resistance-capacitance lag network 50 which has an output conductor 24A leading to the input of the modulator 54. An output conductor 24B leads from the modulator 54 to the input of a second amplifier 56 of conventional type.

The amplifier 56 is so arranged as to vary the ramp rate or slope of the curve of the output signal applied to the output conductor 24C leading from the amplifier 56 with variance in the amplitude of the input signal applied to the amplifier 56 through the input conductor 24B so that such variance in the gain provided by the amplifier 56 effects a specified ramp rate or output signal curve slope at a variance from that of the input signal curve slope. The output signal applied through the conductor 24C in turn controls the operation of servomotor 26C.

In addition, there may be provided a high gain feedback channel 60 leading from the output conductor 24C to summation device 12A. The feedback signals applied through the channels 32A and 60 act in opposition to the command signals applied by device 10A so as to retard the controlling action of the command signals applied by the device 10A to the input of the amplifier 14A in which the feedback signal applied through the channel 32A acts in a similar manner to that of the feedback channel 32 heretofore explained with reference to FIGURE 1 in introducing negligible lag for small amplitude signals while high gain feedback channel 60 functions, as hereinafter explained.

The high gain feedback channel 60 includes a signal conductor 62 leading from the output conductor 24C to the input of a threshold device 64 of conventional type and set to permit the passage of a signal from the input conductor 62 to an output conductor 66 upon the signal exceeding a predetermined value corresponding to a desired or preset attitude limit of the aircraft.

The output conductor 66 leads in turn to a high gain amplifier 68 of conventional type and having an output conductor 70 leading through the input conductor 12A to the high gain amplifier 14A. The gain of the amplifier 68 is much higher than the gain from 12A to 24C so that the over-all gain from the signal device 10A to 24C is reduced to provide the desired preset attitude limiting effect on the aircraft.

The arrangement is such that there is provided through the feedback channel 60 a relatively high gain feedback path upon output signals applied at the conductor 24C exceeding the aforesaid predetermined value. Further, the aforesaid arrangement is such as to produce upon application of such signals to summation device 12A a limiting effect on the output of the command rate limiter and the resulting attitude of the aircraft which is desirable in many applications.

If such amplitude limiting were provided directly at the output conductor 24C after the command modifier system, it would be seen, for example, that large overshoots in heading control could arise from the inability of the command modifier system to then follow directly the input command signal as may be effected in the present system.

From the foregoing, it will be seen that the invention provides a novel full time command modifier in the form of a command rate limiter which provides desired command limiting at all times and introduces negligible lag for small amplitude signals.

Although only two embodiments of the invention have been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A control apparatus for an aircraft having attitude changing means, comprising an attitude command signal device having a signal output, a first high gain amplifier having a signal input operatively connected to the signal output of the attitude command signal device, said first high gain amplifier having a signal output, a demodulator having a signal input operatively connected to the signal output of the first high gain amplifier, said demodulator having a signal output, a limiter having an input operatively connected to the signal output of the demodulator, said limiter having a signal output and being so arranged as to apply thereto a predetermined maximum output signal, the limiter being so arranged that upon the signal applied to the input thereof being less than said predetermined maximum the limiter has negligible effect on said signal applied thereto and therethrough to the output of the limiter, a resistance-capacitance lag network having a signal input operatively connected to the signal output of said limiter, said network having a signal output, a modulator having a signal input operatively connected to the signal output of said network, said modulator having a signal output, a second amplifier having a signal input operatively connected to the signal output of said modulator, said second amplifier having a signal output and being so arranged as to vary the signal applied to the output of said amplifier with the variance in the amplitude of the signal applied to the input of the second amplifier so that the gain provided by the second amplifier effects a predetermined output signal effecting a curve at a variance from that of the curve of the signal applied to the input of the second amplifier, a servomotor to operatively position said attitude changing means, the signal applied to the output of said second amplifier controlling operation of said servomotor, a high gain feedback circuit leading from the output of the second amplifier to the signal input of said first high gain amplifier so as to retard controlling action of the command signals applied by the attitude command device to the first high gain amplifier, said high gain feedback circuit including a threshold limiting device having an input connected to the output of the second amplifier and a signal output, said threshold limiting device being arranged to permit the passage of a signal from its input to its output upon the input signal exceeding a predetermined value corresponding to a preset attitude limit of the aircraft, a third high gain amplifier having an input operatively connected to the output of the threshold limiting device, and said third high gain amplifier having an output connected to the input of the first high gain amplifier and being arranged to apply a high gain feedback signal to the input of said first high gain amplifier acting in opposition to the output signal from the attitude command device and tending to limit the positioning of said attitude changing means by said servomotor to said preset attitude limit of said aircraft.

2. A control apparatus for an aircraft having attitude changing means, comprising an attitude command signal device having a signal output, a first high gain amplifier having a signal input operatively connected to the signal output of the attitude command signal device, said first high gain amplifier having a signal output, a demodulator having a signal input operatively connected to the signal output of the first high gain amplifier, said demodulator having a signal output, a limiter having an input operatively connected to the signal output of the demodulator, said limiter having a signal output and being so arranged as to apply thereto a predetermined maximum output signal, the limiter being so arranged that upon the signal applied to the input thereof being less than said predetermined maximum the limiter has negligible effect on said signal applied thereto and therethrough to the output of the limiter, a resistance-capacitance lag network having a signal input operatively connected to the signal output of said limiter, said network having a signal output, a modulator having a signal input operatively connected to the signal output of said network, said modulator having a signal output, a second amplifier having a signal input operatively connected to the signal output of said modulator, said second amplifier having a signal output and being so arranged as to vary the signal applied to the output of said amplifier with variance in the amplitude of the signal applied to the input of the second amplifier so that the gain provided by the second amplifier effects a predetermined output signal effecting a curve at a variance from that of the curve of the signal applied to the input of the second amplifier, a servomotor to operatively position said attitude changing means, the signal applied to the output of said second amplifier controlling operation of said servomotor, a feedback circuit leading from the output of the second amplifier to the signal input of said first high gain amplifier so as to retard controlling action of the command signals applied by the attitude command device to the first high gain amplifier, and said feedback circuit being so arranged that for low amplitude command signals there may be applied feedback signals through the feedback circuit whereby the command signal is so modified as to introduce negligible lag under low amplitude command operating conditions.

3. A control apparatus for the aircraft having attitude changing means, comprising an attitude command signal device having a signal output, a first high gain amplifier having a signal input operatively connected to the signal output of the attitude command signal device, said first high gain amplifier having a signal output, a demodulator having a signal input operatively connected to the signal output of the first high gain amplifier, said demodulator having a signal output, a limiter having an input operatively connected to the signal output of the demodulator, said limiter having a signal output and being so arranged as to apply thereto a predetermined maximum output signal, the limiter being so arranged that upon the signal applied to the input thereof being less than said predetermined maximum the limiter has negligible effect on said signal applied thereto and therethrough to the output of the limiter, a resistance-capacitance lag network having a signal input operatively connected to the signal output of said limiter, said network having a signal output, a modulator having a signal input operatively connected to the signal output of said network, said modulator having a signal output, a second amplifier having a signal input operatively connected to the signal output of said modulator, said second amplifier having a signal output and being so arranged as to vary the signal applied to the output of said amplifier with variance in the amplitude of the signal applied to the input of the second amplifier so that the gain provided by the second amplifier effects a predetermined output signal effecting a curve at a variance from that of the curve of the signal applied to the input of the second amplifier, a servomotor to operatively position said attitude changing means, the signal applied to the output of said second amplifier controlling operation of said servomotor, a feedback circuit leading from the output of the second amplifier to the signal input of said first high gain amplifier to retard controlling action of the command signals applied by the attitude command device to the first high gain amplifier, and said feedback circuit being so arranged that for low amplitude command signals there may be applied feedback signals through the feedback circuit whereby the command signal is so modified as to introduce negligible lag under low amplitude command operating conditions, a high gain feedback circuit leading from the output of the second amplifier to the signal input of said first high gain amplifier so as to retard controlling action of the command signals applied by the attitude command device to the first high gain amplifier, said high gain feedback circuit including a threshold limiting device having an input connected to the output of the second amplifier and a signal output, said threshold limiting device being arranged to permit the passage of a signal from its input to its output upon the input signal exceeding a predetermined value corresponding to a preset attitude limit of the aircraft, a third high gain amplifier having an input operatively connected to the ouput of the threshold limiting device, and said third high gain amplifier having an output connected to the input of the first high gain amplifier and being arranged to apply a high gain feedback signal to the input of said first high gain amplifier acting in opposition to the output signal from the attitude command device and tending to limit the positioning of said attitude changing means by said servomotor to said preset attitude limit of said aircraft.

4. A control apparatus for an aircraft having attitude changing means, comprising signal command generating means, servomotor means to operatively position said attitude changing means, signal limiter means operatively connected between the command signal generating means and a control input to the servomotor means, said signal limiter means being so arranged that upon the signal applied to the signal limiter means being less than a predetermined maximum the signal limiter means has negligible effect thereon while upon the signal applied to the limiter means being in excess of said predetermined maximum the excessive portion of said signal is effectively limited by said limiter means, a feedback circuit effectively leading from the input to said servomotor means to the command signal generating means so as to apply a feedback signal thereto acting in opposition to the command signal applied by the signal generating means and so modifying the command signal as to introduce negligible lag under low amplitude signal operating conditions, high gain feedback circuit means leading from the input to said servomotor means to the command signal generating means, said high gain feedback circuit means including a threshold limiting device arranged to permit the passage of a feedback signal upon the feedback signal exceeding a predetermined value corresponding to a preset attitude limit of the aircraft, and high gain amplifier means arranged to operatively connect an output of the threshold limiting means to the command signal generating means and arranged to provide a high gain feedback signal in opposition to the signal from the signal generating means and tending to limit the position of said attitude changing means by said servomotor means to a preset attitude limit of said aircraft.

5. Control apparatus for an aircraft having attitude changing means, comprising means for providing command signals, an amplitude limiter connected to the command signal means and limiting signals to a predetermined maximum when their amplitude exceeds the predetermined maximum and passing signals with negligible effect thereon when their amplitude is less than the predetermined amplitude, integrating means connected to the limiter and having an output, a servomotor connected to the output of the integrating means for operating the attitude changing means, feedback circuit means conecting the output of the integrating means to the command signal means to provide feedback signals in opposition to the command signals and having a threshold device for passing signals above a predetermined amplitude.

6. Control apparatus for an aircraft having attitude changing means, comprising means for providing command signals, a high gain amplifier having an input connected to the command signal means, a limiter connected to the high gain amplifier and limiting signals to a predetermined maximum when their amplitude exceeds the predetermined maximum and passing signals with negligible effect thereon when their amplitude is less than the predetermined maximum, integrating means connected to the limiter and having an output, a servomotor connected to the output of the integrating means for operating the attitude changing means, feedback circuit means having means for passing low amplitude signals with relatively low gain and for passing signals above a predetermined minimum with relatively high gain connecting the output of the integrating means to the input of the high gain amplifier to provide feedback signals in opposition to the command signals.

7. Control apparatus for an aircraft having attitude changing means, comprising means for providing command signals, a high gain amplifier having an input connected to the command signal means, a limiter connected to the high gain amplifier and limiting signals to a predetermined maximum when their amplitude exceeds the predetermined maximum and passing signals with negligible effect thereon when their amplitude is less than the predetermined maximum integrating means connected to the limiter and having an output, as servomotor connected to the output of the integrating means for operating the attitude changing means, a feedback circuit connecting the output of the integrating means to the input of the high gain amplifier to retard controlling action of the command signals, said feedback circuit being arranged so that for low amplitude command signals the command signals are modified to introduce negligible lag under low amplitude command operating conditions, a high gain feedback circuit connecting the output of the integrating means to the input of the high gain amplifier to retard controlling action of the command signals, said high gain feedback circuit including a threshold device permitting passage of the signal upon the signal exceeding a predetermined value corresponding to a preset attitude limit of the aircraft and a high gain amplifier connected to the threshold device.

8. Control apparatus for an aircraft having attitude changing means, comprising means for providing command signals, a high gain amplifier having an input connected to the command signal means, a limiter connected to the high gain amplifier and limiting signals to a predetermined maximum when their amplitude exceeds the predetermined maximum and passing signals with negligible effect thereon when their amplitude is less than the predetermined maximum, integrating means connected to the limiter and having an output, a servomotor connected to the output of the integrating means for operating the attitude changing means, feedback circuit means connecting the output of the integrating means to the input of the high gain amplifier to provide feedback signals in opposition to the command signals and having a threshold device for passing signals above a predetermined amplitude.

9. Control apparatus for an aircraft having attitude changing means, comprising means for providing command signals, a high gain amplifier having an input connected to the command signal means, a limiter connected to the high gain amplifier and limiting signals to a predetermined maximum when their amplitude exceeds the predetermined maximum and passing signals with negligible effect thereon when their amplitude is less than the predetermined maximum, integrating means connected to the limiter and having an output, a servomotor connected to the output of the integrating means for operating the attitude changing means, feedback circuit means having a first path of relatively low gain and a second path of relatively high gain connecting the output of the integrating means to the input of the high gain amplifier to provide feedback signals in opposition to the command signals, the high gain path including a high gain threshold device for passing signals above a predetermined amplitude and a high gain amplifier connected thereto.

10. Control apparatus for an aircraft having attitude changing means operated by a servomotor energized at its input, comprising means for providing command signals, summation means connected to the command signal means, feedback circuit means having a first path of relatively low gain and a second path of relatively high gain connecting the input of the servomotor to the summation means in opposition to the command signal means to provide summation signals corresponding to rate of change of command signals, the second path having a threshold device for passing signals above a predetermined amplitude and a high gain amplifier connected thereto, an amplitude limiter connected to the summation means and receiving the rate command signals and limiting the signals to a predetermined maximum when their amplitude exceeds the predetermined maximum and passing signals with negligible effect thereon when their amplitude is less than the predetermined maximum, and integrating means connected to the limiter and to the input of the servomotor and energizing the servomotor.

11. Control apparatus for an aircraft having attitude changing means operated by a servomotor energized at its input, comprising means for providing command signals, summation means connected to the command signal means, feedback circuit means having a first path of relatively low gain and a second path of relatively high gain connecting the input of the servomotor to the summation means in opposition to the command signal means to provide summation signals corresponding to rate of change of command signals, the second path having a threshold device for passing signals above a predetermined amplitude and a high gain amplifier connected thereto, an amplifier connected to the summation means and receiving the rate command signals, an amplitude limiter connected to the last-mentioned amplifier and receiving the amplified rate command signals and limiting the signals to a predetermined maximum when their amplitude exceeds the maximum and passing signals with negligible effect thereon when their amplitude is less than the predetermined maximum, and integrating means connected to the limiter and to the input of the servomotor and energizing the servomotor.

12. Control apparatus for an aircraft having attitude changing means, comprising a servomotor energized at its input for operating the attitude changing means, means for providing command signals, summation means connected to said command signal means, feedback circuit means connecting the input of the servomotor to the summation means in opposition to the command signal means to provide summation signals corresponding to rate of change of command signals, the feedback circuit means including a high gain path having a threshold device for passing signals above a predetermined amplitude and a high gain amplifier connected thereto, an amplitude limiter connected to the summation means and receiving signals corresponding to rate of change of command signals and limiting the signals to a predetermined maximum when their amplitude exceeds the predetermined maximum and passing signals with negligible effect thereon when their amplitude is less than the predetermined maximum, and integrating means connected to the limiter and to the input of the servomotor and energizing the servomotor.

References Cited by the Examiner

UNITED STATES PATENTS

| | | | |
|---|---|---|---|
| 2,751,542 | 6/56 | Woodward | 318—489 |
| 2,751,543 | 6/56 | Alderson | 318—489 |
| 2,809,340 | 10/57 | Bernhart | 318—489 |

JOHN F. COUCH, *Primary Examiner.*